US011604784B2

(12) United States Patent
Basak et al.

(10) Patent No.: US 11,604,784 B2
(45) Date of Patent: *Mar. 14, 2023

(54) ESTABLISHING DECENTRALIZED IDENTIFIERS FOR ALGORITHMS, DATA SCHEMAS, DATA SETS, AND ALGORITHM EXECUTION REQUESTS

(71) Applicant: FortifID, INC., San Jose, CA (US)

(72) Inventors: Anirban Basak, San Jose, CA (US); Thomas P. Hardjono, Winchester, MA (US); Shantanu Rajkumar Kothavale, Cupertino, CA (US)

(73) Assignee: FortifID, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,497

(22) Filed: Mar. 24, 2021

(65) Prior Publication Data

US 2021/0349882 A1    Nov. 11, 2021

Related U.S. Application Data

(63) Continuation of application No. 16/810,122, filed on Mar. 5, 2020, now Pat. No. 10,990,584.

(Continued)

(51) Int. Cl.
*G06F 16/23* (2019.01)
*G06F 16/21* (2019.01)
(Continued)

(52) U.S. Cl.
CPC ........ *G06F 16/2365* (2019.01); *G06F 16/211* (2019.01); *G06F 16/28* (2019.01); *H04L 9/0637* (2013.01); *H04L 9/3247* (2013.01)

(58) Field of Classification Search
CPC .... G06F 16/2365; G06F 16/28; G06F 16/211; H04L 9/3247; H04L 9/0637
(Continued)

(56) References Cited

U.S. PATENT DOCUMENTS 9,635,000 B1    4/2017  Muftic
10,530,577 B1 *  1/2020  Pazhoor ................ H04L 9/3239
(Continued)

FOREIGN PATENT DOCUMENTS

WO    2010/096684 A2    8/2010
WO    2019/209291 A1   10/2019

OTHER PUBLICATIONS

European Search Report and Search Opinion, EP App. No. 19781804, dated Nov. 18, 2021, 8 pages.
(Continued)

*Primary Examiner* — Dung K Chau
(74) *Attorney, Agent, or Firm* — Nicholson De Vos Webster & Elliott LLP (57) ABSTRACT

Techniques are described that enable client computer systems to request an attestation provider server to execute a given algorithm as identified by a decentralized algorithm identifier on the blockchain, using a specific data set. In some embodiments, the owners of the algorithms, data schemas, and data sets use their private key to sign/register each of these decentralized identifier structures, which includes a copy of the owner's public key. Ownership of these decentralized identifiers can be validated by verifying the digital signatures on the blockchain. In some embodiments, only the owner can replace or delete (retire) these identifiers by creating a cancellation transaction on the blockchain for each of these identifiers. In some scenarios, the decentralized identifier structures may include payment options for requesting the execution of an algorithm upon a given appropriate data set.

20 Claims, 6 Drawing Sheets

Related U.S. Application Data (60) Provisional application No. 62/953,002, filed on Dec. 23, 2019.

(51) Int. Cl.
    *G06F 16/28*    (2019.01)
    *H04L 9/06*     (2006.01)
    *H04L 9/32*     (2006.01)

(58) Field of Classification Search
    USPC .......................................................... 707/703
    See application file for complete search history.

(56)  References Cited

U.S. PATENT DOCUMENTS

| | | |
|---|---|---|
| 2003/0229783 A1 | 12/2003 | Hardt |
| 2006/0026042 A1 | 2/2006 | Awaraji et al. |
| 2011/0145056 A1 | 6/2011 | Sullivan et al. |
| 2012/0023568 A1 | 1/2012 | Cha et al. |
| 2013/0124400 A1 | 5/2013 | Hawkett |
| 2013/0212699 A1 | 8/2013 | Pollard |
| 2013/0246120 A1 | 9/2013 | Chang et al. |
| 2014/0172567 A1 | 6/2014 | Manoogian et al. |
| 2015/0348341 A1 | 12/2015 | Baxley et al. |
| 2016/0063657 A1 | 3/2016 | Chen et al. |
| 2017/0228550 A1 | 8/2017 | Harb |
| 2017/0250972 A1 | 8/2017 | Ronda et al. |
| 2019/0005223 A1 | 1/2019 | Messerges et al. |
| 2019/0013948 A1* | 1/2019 | Mercuri ................. G06F 9/451 |
| 2019/0164156 A1* | 5/2019 | Lindemann ...... G06Q 20/40145 |
| 2019/0253254 A1* | 8/2019 | Brownlee ............. H04L 9/3239 |
| 2019/0312734 A1* | 10/2019 | Wentz ................... H04L 9/3265 |
| 2019/0347627 A1 | 11/2019 | Lin et al. |
| 2019/0356491 A1* | 11/2019 | Herder, III ............ H04L 9/0894 |
| 2020/0036707 A1* | 1/2020 | Callahan ............... H04L 9/3231 |
| 2020/0084046 A1* | 3/2020 | Bessonov ............. H04L 9/3239 |
| 2020/0137064 A1* | 4/2020 | Wu ....................... G06F 16/182 |
| 2020/0162251 A1* | 5/2020 | Wentz ................. G06F 21/6218 |
| 2020/0162254 A1* | 5/2020 | Moreno ................ H04L 9/3242 |
| 2020/0259643 A1* | 8/2020 | Pazhoor ............. G06F 21/6218 |

OTHER PUBLICATIONS

Examination Report, IN App. No. 202117013195, dated Feb. 4, 2022, 5 pages.

Corrected Notice of Allowance, U.S. Appl. No. 16/274,070, dated Jul. 10, 2019, 3 pages.

International Search Report and Written Opinion, PCT App. No. PCT/US2019/025221, dated Jul. 5, 2019, 10 pages.

International Search Report and Written Opinion, PCT App. No. PCT/US2019/054442, dated Dec. 19, 2019, 14 pages.

Nakamoto, Satoshi., "Bitcoin: A Peer-to-Peer Electronic Cash System", 2008, pp. 1-9.

Non-Final Office Action, U.S. Appl. No. 16/219,745, dated Mar. 28, 2019, 12 pages.

Non-Final Office Action, U.S. Appl. No. 16/506,844, dated Jul. 14, 2020, 6 pages.

Non-Final Office Action, U.S. Appl. No. 16/810,122, dated Jun. 10, 2020, 11 pages.

Notice of Allowance, U.S. Appl. No. 16/810,122, dated Dec. 24, 2020, 7 pages.

Notice of Allowance, U.S. Appl. No. 16/219,745, dated Sep. 19, 2019, 15 pages.

Notice of Allowance, U.S. Appl. No. 16/274,070, dated May 28, 2019, 14 pages.

International Search Report and Written Opinion, PCT App. No. PCT/US20/66734, dated May 5, 2021, 11 pages.

\* cited by examiner

ESTABLISHING DECENTRALIZED IDENTIFIERS FOR ALGORITHMS, DATA SCHEMAS, DATA SETS, AND ALGORITHM EXECUTION REQUESTS

CROSS-REFERENCE TO RELATED APPLICATIONS

This application claims benefit under 35 U.S.C. § 120 as a continuation of U.S. patent application Ser. No. 16/810,122, filed Mar. 5, 2020, which application claims the benefit of U.S. Provisional Application No. 62/953,002, filed Dec. 23, 2019, both of which are hereby incorporated by reference.

TECHNICAL FIELD

Embodiments of the invention relate to a computer-implemented system that facilitates establishing unique (i) decentralized identifiers for algorithms, (ii) decentralized identifiers for data schemas, (iii) decentralized identifiers for data sets, and (iv) decentralized attestation receipts, where these distinct identifiers—together with their respective Uniform Resource Locators (URLs) and application programming interfaces (APIs) for access—are registered on a blockchain system.

BACKGROUND

There are many existing products and services that seek to obtain consent from consumers related to various uses of their private data. When insight information is sought regarding an individual in the context of a transaction related to that individual, privacy of the individual can be compromised due to the intentional or inadvertent leaking of such private information. For example, when a person seeks to obtain a mortgage or other type of financial loan, a loan provider typically performs a risk analysis process that requires the person to provide various items of private information such as a Social Security Number (SSN). This private information is then often used by the service provider to query various external data providers (for example, banks, credit card providers, and the like) to obtain historical information and other additional data about the individual possessed by the data providers. In many cases, the private information provided by the individual is retained afterwards by the service provider even though the service provider does not need to be in possession of the data beyond the completion of the requested transaction. The transmission, use, and retention of such private data by various service providers and data providers causes individuals' private data to be susceptible to many types of undesired uses.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media that enable client computer systems (also referred to as "requesters") to request an attestation provider server to execute a given algorithm as identified by a decentralized algorithm identifier on the blockchain, using a specific data set. In some embodiments, the owners of the algorithms, data schemas, and data sets use their private key to sign/register each of these decentralized identifier structures, which includes a copy of the owner's public key. Ownership of these decentralized identifiers can be validated by verifying the digital signatures on the blockchain. In some embodiments, only the owner can replace or delete (retire) these identifiers by creating a cancellation transaction on the blockchain for each of these identifiers. In some scenarios, the decentralized identifier structures may include payment options for requesting the execution of an algorithm upon a given appropriate data set.

In some embodiments, a client system can be implemented as a software application running on a client computing device (e.g., a general-purpose personal computer, such as a desktop or laptop computer running a standard operating system, as well as cellular, wireless, and handheld devices running mobile software and capable of supporting a number of networking and messaging protocols) or running as a software application implemented by computing resources (e.g., physical servers, virtual machine (VM) instances, containers, object storage, block-level storage, network-related resources, databases, etc.) located in an on-premises datacenter or on computing resources provided by a cloud provider network. Similarly, the attestation provider server can be implemented as application software running on computing resources directly managed by an entity associated with the attestation provider server, or running on computing resources provided by a cloud provider network and which listen and respond to requests from client computer systems. In some embodiments, a client computer system sends requests to the attestation provider across one or more intermediate networks (e.g., including the public internet), using a message set and communications protocol directed at a predefined application programming interface (API) implemented by the attestation provider. Here, an API refers generally to an interface and/or communication protocol between a client (e.g., a client computer system) and a server (e.g., an attestation provider server), such that a request generated using a predefined format causes the server to generate a response or cause predefined actions to be initiated.

Figure 1:
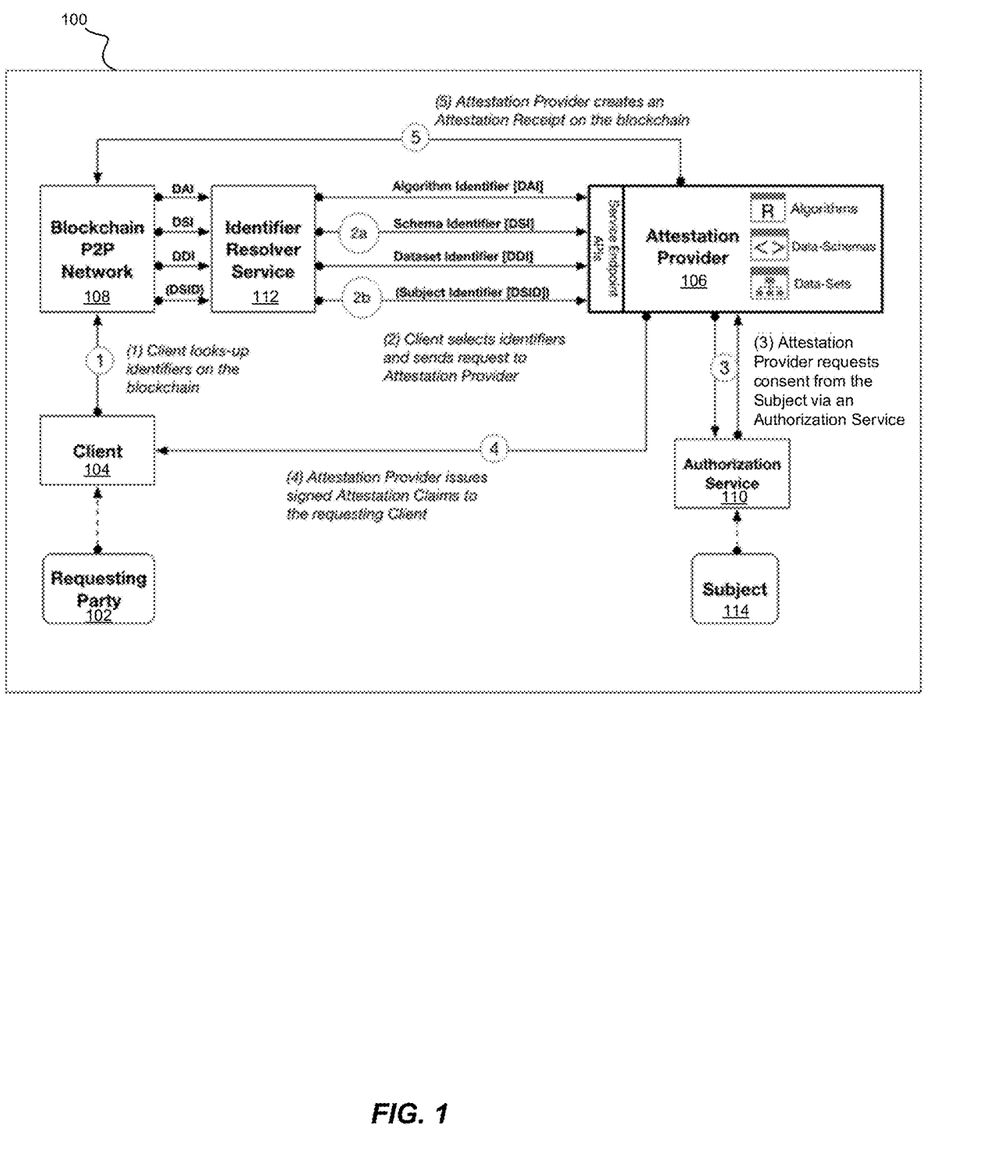
FIG. 1 is a block diagram illustrating an exemplary computing environment in which a client system requests an attestation provider to execute algorithms as identified by a decentralized algorithm identifier on a blockchain according to some embodiments.

In some embodiments, a data set is identified by a decentralized data set identifier also found on the blockchain, while the data schema for the data set in question is identified by a decentralized schema identifier on the blockchain. An example of this is illustrated in FIG. 1.

As one non-limiting example, a data set could be one pertaining to the geolocation of a device (e.g., a mobile phone) belonging to a subject (e.g. a person, citizen). A typical geolocation data set, for example, consists of at least 3 values [latitude, longitude, altitude], each specified in decimal degrees. Additional values may be associated with [heading, speed] values. If the subject's mobile device generates this data entry every few seconds, the subject will have associated with them several thousand geolocation entries each day. This data represents valuable behavioral data about the subject and may reveal distinct aspects about the subject that may be private. In this example, an algorithm could be designed for the geolocation data set that can yield interesting insights without compromising the subject's privacy. For example, given a data set consisting of 6-months' worth of the triple values [latitude, longitude, altitude], an algorithm could compute the average distance travelled daily by the subject over six months. Such insights may be valuable to external entities, such as marketing companies, governments and other organizations. For example, the insights about the subject's distance travelled daily could inform an auto-company whether to consider advertising a car to the subject (person).

As such, if the attestation provider has possession of a copy of these data sets belonging to a subject, it is the responsibility of the attestation provider to safeguard the privacy rights of the subject. Among other processes, the attestation provider prevents data sets from being copied or moved out of its data repository (e.g., a database) without the consent of the subject to which the data sets pertain. The attestation provider further prevents the data set from being revealed to any other persons or entities. In some embodiments, the attestation provider however enables a client, as an external entity, to glean insights from the data set through the attestation provider executing one or more algorithms that the attestation provider has predetermined.

In some embodiments, to allow the client to choose the algorithm to be executed on a given data set (one or more of many), the attestation provider associates a decentralized algorithm identifier with each algorithm and a decentralized data set identifier to each unit of data set (e.g., per subject geolocation data set). The attestation provider registers the decentralized algorithm identifier and decentralized data set identifier to the blockchain by creating a transaction record (suitable for the given blockchain), digitally signs it, and then transmits it to the peer-to-peer (P2P) network of nodes that comprise the blockchain system. Once the blockchain nodes process the transaction and confirm it, the record (containing the decentralized algorithm identifier, for example) will be publicly readable by other entities. Since the attestation provider signs the record using its private key (and only the attestation provider holds the private key), other entities who read the decentralized algorithm identifier from the blockchain record can obtain assurance of its source authenticity.

FIG. 1 is a block diagram illustrating an exemplary computing environment 100 in which a client system requests an attestation provider to execute algorithms as identified by a decentralized algorithm identifier on a blockchain according to some embodiments. In FIG. 1, the numbered circles "1"-"5" illustrate a process in which a client computing system requests an attestation provider to execute algorithms, where the attestation provider delivers the response in an attestation claim, according to some embodiments. In some embodiments, at the circle labeled "1" in FIG. 1, when a requester entity 102 (e.g., a person associated with a marketing company or other entity) uses a client 104 computing device including software that enables the requester entity 102 to seek information in the form of attestation claims from the attestation provider 106, the client 104 first looks to the blockchain 108 to locate a description of the desired algorithm, the desired target data set, and understand the data schema of the target data set. Note that the blockchain record contains only the description of the algorithms, data schemas, and data sets—it does not carry the actual items. The actual algorithms, data schemas, and data sets are privately held by the attestation provider 106 entity and are not available directly to the client 104. The attestation provider 106 holds the actual algorithms, data schemas, and data sets in its internal database within its enterprise network, which is only accessible by the attestation provider.

In some embodiments, the required fees for executing the algorithm is listed in the decentralized algorithm identifier structure found on the blockchain record.

In some embodiments, at circle "2a," when the client 104 system finds the desired algorithm/data set on the blockchain, it follows the link found in the decentralized identifier structure on the blockchain record. The link brings the client 104 to a specific API endpoint located at the attestation provider 106 entity. The client 104 system effects the request by submitting the triple values [decentralized algorithm identifier, decentralized data set identifier, decentralized schema identifier] to the API endpoint at the attestation provider 106 together with the payment (or evidence that payment has been received), if any payment is necessary.

In some embodiments, if the algorithm is subject-specific (e.g., the algorithm pertains to an individual person), the client 104 system also obtains the decentralized subject identifier at circle "2b" from the blockchain 108, or obtains it using other means, and sends it with the request to the attestation provider 106.

In some embodiments, in order to find the correct service endpoint on the Internet belonging to the attestation provider 106, the client 104 system uses an identifier resolver service 112 that may be operated by the attestation provider 106 or by some other entity.

In some embodiments, at circle "3", if the client 104 system includes a decentralized subject identifier—indicating it seeks a subject-specific response—then the attestation provider 106 requests the explicit consent of the indicated subject 114 (e.g., the consent of the person whose data set is held by the attestation provider 106) in executing the algorithm on the subject's specific data set (for example, for privacy regulation compliance requirements). This is done through the authorization service 110 that the subject employs. The authorization service 110 may be independent from the attestation provider 106 or it may be operated by the attestation provider 106.

In some embodiments, a subject 114 approves or pre-approves the request by setting consent policies on the authorization service 110. The authorization service 110 interacts with the attestation provider 106 through a separate authorization protocol. For example, the subject 114 can set a consent policy in the authorization service 110 system which states that for the subject's geolocation data, only average calculation may be performed by the algorithms run by the attestation provider 106. Another example consent policy set by the subject may specify that if an algorithm targets a very narrow subset of the subject's geolocation data set (e.g., one day in the month), then the algorithm halts into pending mode to await the subject's explicit approval. This then triggers a message to be sent to the subject seeking approval (e.g., using an email or text notification). In some embodiments, the subject provides a response, such by logging into the authorization service 110 system and providing permission.

In some embodiments, at circle "4" in FIG. 1, the attestation provider 106 computes the desired algorithm over the data set to obtain a results data set, and returns the response in an attestation claims data structure, which is digitally signed by the attestation provider and is delivered to the client 104 via a secure channel (e.g., an SSL connection).

In some embodiments, at circle "5," the attestation provider 106 creates an attestation receipt data structure on the blockchain 108 (or to a different blockchain) to log the event. The attestation receipt data structure carries the evidence of consent from the subject in cases where the algorithm is subject-specific (e.g., as a result of the inclusion of a decentralized subject identifier at circle "2b" in FIG. 1), or as proof more generally of completion of the transaction (e.g., for aggregate-level responses).

EXAMPLE TYPES OF ALGORITHMS

In some embodiments, there are at least two general types of algorithms used by an attestation provider service:

(a) Aggregate-level algorithms. In some embodiments, an aggregate-level algorithm returns an aggregate-level response which does not lead to the re-identification of an individual person (e.g., an individual subject). As such, no subject consent is needed. Using the previous geolocation data set example, an aggregate-level algorithm may be applied to the data sets of several hundred to several thousand subjects. For example, an algorithm could compute the average distance traveled monthly by residents of San Francisco. This insight does not identify any specific subject (e.g., any particular resident of San Francisco) and as such preserves the privacy of the subjects whose data sets were used. In FIG. 1, this is denoted at circle "2a" where the client 104 system only chooses a decentralized algorithm identifier, a decentralized schema identifier, and a decentralized data set identifier.

(b) Subject-specific algorithms. In some embodiments, a subject-specific algorithm returns insights and other computational results specific to an individual subject. As such, in some embodiments, explicit consent is required prior to executing the algorithm on the target data set. For example, a person (subject) seeking a car loan may be required to reveal the person's average weekly credit card expenditure to a loan company from which the car loan is being sought. Rather than giving the loan company the raw credit card data sets, an attestation provider 106 can run an algorithm that computes these weekly expenditure amounts and places the amounts inside an attestation claim data structure to be transmitted by the attestation provider 106 (or by the subject) to the loan company. In FIG. 1 this is denoted by the addition of the person's decentralized subject identifier at circle "2b" (together with the other selections of a decentralized algorithm identifier, a decentralized schema identifier, and a decentralized data set identifier). The loan company using the client 104 system includes the decentralized subject identifier of the loan applicant in its request. The attestation claim data structure returned at circle "4" may also include the decentralized subject identifier of the loan applicant (person).

Registration of Decentralized Identifier Records to the Blockchain

In some embodiments, the attestation provider 106 makes known the availability of a new algorithm by (i) registering (or recording) a decentralized algorithm identifier record to the blockchain system 108 and (ii) creating a new resolver record at the identifier resolver service 112. This is further illustrated in FIG. 2. The protocol is similar for registering new data sets (decentralized data set identifier records) and data schemas (decentralized schema identifier records). In the following, the algorithm case is used as a representative example.

Figure 2:
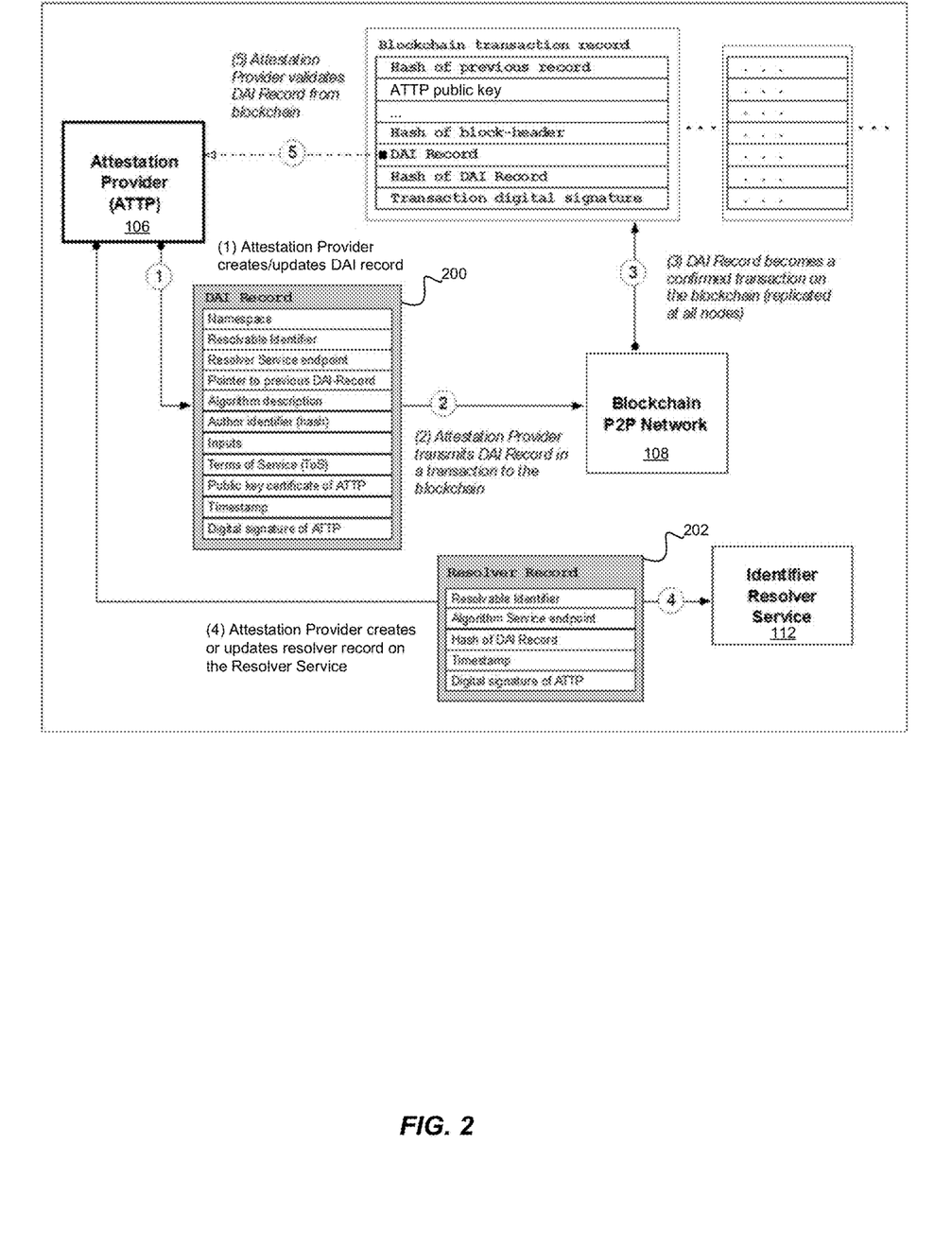
FIG. 2 is a block diagram illustrating an exemplary computing environment in which an attestation provider registers a decentralized algorithm identifier record onto a blockchain P2P network and adds new resolver records according to some embodiments.

In some embodiments, at circle "1" in FIG. 2, the attestation provider 106 creates a decentralized algorithm identifier record 200, which consists of information and parameters pertaining to the algorithm. This includes, among others, its unique decentralized algorithm identifier, the mechanism to link-resolve that identifier via a resolver service 112, the description of the algorithm, the hash of the author identifier, the expected inputs to the algorithm, the terms of use/service of the algorithm, and so on. In some embodiments, the decentralized algorithm identifier record 200 is digitally signed by the attestation provider 106.

In some embodiments, at circle "2" in FIG. 2, the attestation provider 106 creates a new blockchain transaction containing the decentralized algorithm identifier record, signs the transaction, and transmits the blockchain transaction to the relevant blockchain P2P network 108.

In some embodiments, at circle "3" in FIG. 2, the attestation provider 106 waits for the blockchain transaction to be accepted and confirmed by the blockchain P2P network 108. Once the transaction appears on the confirmed blocks of the ledger of the blockchain P2P network 108, the attestation provider 106 obtains assurance that the decentralized algorithm identifier record 200 is visible and accessible on the blockchain 108.

In some embodiments, at circle "4" in FIG. 2, the attestation provider 106 creates a new resolver record 202 for the identifier resolver service 112 that is employed. The resolver record 202 indicates, among others, the service endpoint at the attestation provider 106 to which requests for the execution of the algorithm (as identified by the decentralized algorithm identifier in the decentralized algorithm identifier record 200) may be directed.

In some embodiments, if an existing decentralized algorithm identifier record is to be updated by new information, the attestation provider 106 creates a new decentralized algorithm identifier record (with the same decentralized algorithm identifier) which carries a pointer to the previous decentralized algorithm identifier record. This decentralized algorithm identifier record will have a new timestamp. In general, clients seek the most recent decentralized algorithm identifier record by checking its timestamp.

If the attestation provider 106 seeks to indicate the unavailability of an algorithm (e.g., an algorithm that was previously listed in a decentralized algorithm identifier record on the blockchain 108), the attestation provider 106 creates a new decentralized algorithm identifier record (with the same decentralized algorithm identifier) but where the rest of fields are blank or contain null values.

Client Resolution of the Decentralized Identifier Records

In some embodiments, when a client computing system seeks to request execution of an algorithm, it accesses the blockchain P2P network to look for the desired confirmed blockchain-transaction that holds the relevant decentralized algorithm identifier record. Once the desired decentralized algorithm identifier record is obtained from the blockchain, the client looks for the resolver service endpoint that is specified in the decentralized algorithm identifier record and visits that endpoint. When the client accesses the resolver service endpoint, it provides as input the decentralized algorithm identifier. If a matching resolver record is found (e.g., one that carries the decentralized algorithm identifier), the resolver service returns the resolver record to the client.

Once the client is in possession of the correct resolver record, the client looks up the address (e.g., identified by an IP address and port number or a Uniform Resource Identifier (URI)) of the algorithm service endpoint located at the attestation provider. The client can now request the execution of the algorithm using the algorithm service endpoint at the attestation provider (e.g., by sending an API request to the algorithm service endpoint). Note that, in some embodiments, the attestation provider may update (modify) or delete an algorithm service endpoint. A deletion means that clients are no longer able to request the execution of the algorithm. In some circumstances, the attestation provider may simply deny the request from a client (e.g. an unknown client, etc.).

Encryption of Decentralized Identifier Records on the Blockchain

Figure 3:
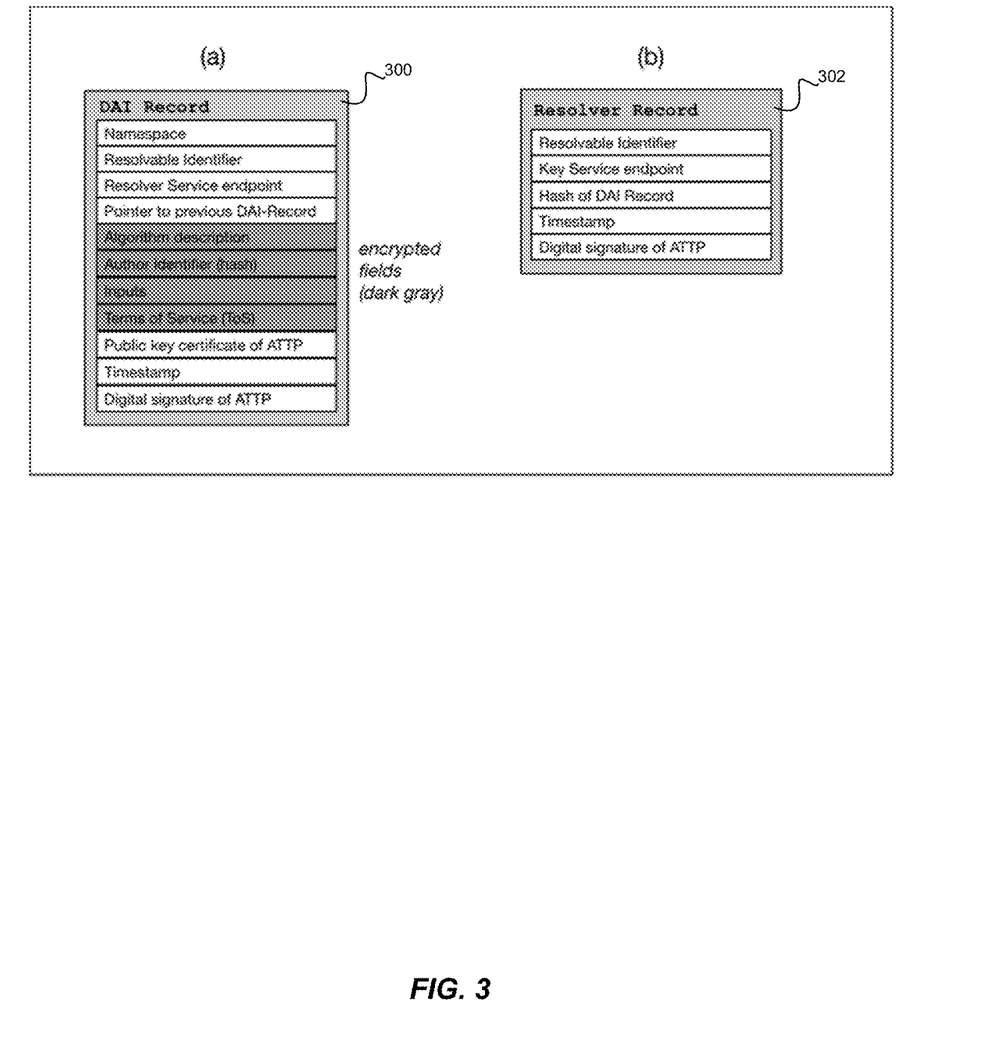
FIG. 3 is a block diagram illustrating (a) examples of encrypted fields within a decentralized algorithm identifier record, and (b) a resolver record pointing to a key service endpoint at which the client authenticates and performs key negotiations according to some embodiments.

In some embodiments, there are deployment use cases in which information about an algorithm, data set, schema, the service endpoints, or combinations thereof, may be confidential. In this case, in some embodiments, the attestation provider encrypts some fields of the decentralized algorithm identifier record (or decentralized data set identifier record, or decentralized schema identifier record) using the appropriate encryption key. FIG. 3 is a block diagram illustrating (a) examples of encrypted fields within a decentralized algorithm identifier record 300, and (b) a resolver record 302 pointing to a key service endpoint at which a client authenticates and performs key negotiations according to some embodiments.

For cases where the detailed information in a record for the algorithm (or data set or schema) is considered confidential, in some embodiments, the relevant information in the decentralized algorithm identifier record is encrypted by the attestation provider using a symmetric key. Correspondingly, the resolver record for that algorithm record is made to point by the attestation provider to a key service endpoint operated by the attestation provider. Here, the client takes an extra step to obtain the decryption keys.

As before, a client device obtains the decentralized algorithm identifier record for the algorithm from the blockchain and resolves the decentralized algorithm identifier to the correct identifier resolution service that returns a resolver record containing the address of the key service endpoint. After obtaining the correct decryption key from the key service endpoint, the client is able to decrypt the encrypted fields in the decentralized algorithm identifier record found earlier on the blockchain. In some embodiments, the decryption key is able to be used by the client for only a limited period of time. Once the information has been decrypted, the client is able to proceed with the normal access to the algorithm service endpoint at the attestation provider.

The Decentralized Algorithm Identifier (Dai) Data Structure

In some embodiments, a decentralized algorithm identifier (or DAI) is a data structure (e.g., a JSON-formatted data structure) on the blockchain that describes an algorithm (e.g., using pseudocode or other higher level description), the required inputs to the algorithm, the resulting output, and a resolvable link to a protected service endpoint where a request can be made for execution of the algorithm.

In some embodiments, the creator and owner of a decentralized algorithm identifier digitally signs the decentralized algorithm identifier structure and records the decentralized algorithm identifier to the blockchain. The creator/owner of a decentralized algorithm identifier may use the same private/public key pair to sign the decentralized algorithm identifier and to record it on the blockchain, or it may use two separate public/private key pairs to sign and record the decentralized algorithm identifier. In either case, in some embodiments, there is additionally proof of legal ownership of the key (e.g. X509 certificate issued by a commercial certification authority).

The decentralized algorithm identifier data structure may be embodied in several formats (e.g., a JSON document), where the data structure contains some or all of the following information:

Namespace of the attestation provider: This is the namespace belonging to the attestation provider within which this decentralized algorithm identifier is recognized and can be resolved.

Resolvable identifier of the algorithm: This is the identifier string that when followed resolves to the service endpoint at the attestation provider for that given algorithm.

Algorithm description: This is a humanly readable description of what the algorithm performs, the expected data set inputs, and the expected results. This description may include a pseudocode representation of the algorithm.

Algorithm author identifier (hash): This is an identifier string for the entity who authored the algorithm. For privacy purposes, only a cryptographic hash of the author identifier may be used instead.

Attestation output formats: This is a humanly readable description of the available output formats supported by the attestation provider.

List of inputs required: This is a humanly readable description of what algorithm inputs are required.

Service endpoint to obtain attestation claims: This is an identifier of the location for the client to obtain the attestation claims results.

Duration of validity: This is a humanly readable description of the duration in time of the validity of the attestation claims.

Terms of service: This is link to the legal prose describing the legal terms of use of the service and of the attestation claims.

Fees for execution: This is humanly readable description of the fees requires for executing this algorithm.

Timestamp: This is the date timestamp when the decentralized algorithm identifier structure was created and signed.

Public key information of attestation provider: This is the public key of the attestation provider together with a legal certification of the public key to prove the legal ownership of the public key.

Digital signature of attestation provider: This is the cryptographic digital signature of the attestation provider on the decentralized algorithm identifier structure using the standard signatures.

The Decentralized Data Set Identifier (DDI) Structure

In some embodiments, a decentralized data set identifier (or DDI) is the data structure (e.g. JSON structure) on the blockchain that describes a data set available, together with the applicable algorithms (e.g., the decentralized algorithm identifier) that may be executed on the data set and a resolvable link to a protected service endpoint where the data set is located. The decentralized data set identifier does not carry the data set itself. Only the attestation provider has access to the data set.

The decentralized data set identifier data structure may be embodied in several formats (e.g., a JSON document) and, in some embodiments, contains some or all of the following information:

- Namespace of the attestation provider: This is the namespace belonging to the attestation provider within which this decentralized data set identifier is recognized and can be resolved.
- Resolvable identifier of the data set: This is the identifier string that when followed will resolve to the service endpoint at the attestation provider that holds the data set.
- Data set type: This is a humanly readable description of the type of the data set, including size and other attributes. For example, "this is a data set containing geolocation data" if the data set pertains to geolocation data.
- Resolvable identifier of the applicable algorithm(s): This is the identifier string that when followed will resolve to the service endpoint at the attestation provider for that given algorithm.
- Provenance score: This is a score value (e.g. out of 10) indicating the degree of confidence of the attestation provider with regards to the provenance or origin of the data set (as known by the attestation provider).
- Duration of availability: This is a humanly readable description of the duration in time of the availability of the data set (after which the data set may no longer be available).
- Terms of service: This is link to the legal prose describing the legal terms of use of the service and of the attestation claims.
- Timestamp: This is the date timestamp when the DDI structure was created and signed.
- Public key information of attestation provider: This is the public-key of the attestation provider together with a legal certification of the public-key to prove the legal ownership of the public key.
- Digital signature of attestation provider: This is the cryptographic digital signature of the attestation provider on the DDI structure using the standard signatures.

The Decentralized Schema Identifier (DSI) Structure

In some embodiments, a decentralized schema identifier (or DSI) is the data structure (e.g. JSON structure) on the blockchain that describes the schema (data schema) pertaining to a given data set together with a resolvable link to a protected service endpoint where the schema is located. Multiple data sets may be formed using the same data schema. In some embodiments, the decentralized schema identifier does not carry the full schema itself and only the attestation provider has access to the full schema.

The decentralized schema identifier data structure may be embodied in several formats (e.g. JSON document), where the data structure contains some or all of the following information:

- Namespace of the attestation provider: This the namespace belonging to the attestation provider within which this decentralized schema identifier is recognized and can be resolved.
- Resolvable identifier of the schema: This is the identifier string that when followed will resolve to the service endpoint at the attestation provider that holds the data schema.
- Data set type: This is a humanly readable description of the type of the data set for which the schema applies.
- Schema author identifier (hash): This is an identifier string for the entity who authored the data schema. For privacy purposes, only a cryptographic hash of the author identifier may be used instead.
- Terms of service: This is link to the legal prose describing the legal terms of use of the service and of the attestation claims.
- Timestamp: This is the date timestamp when the decentralized schema identifier structure was created and signed.
- Public key information of attestation provider: This is the public-key of the attestation provider together with a legal certification of the public-key to prove the legal ownership of the public key.
- Digital signature of attestation provider: This is the cryptographic digital signature of the attestation provider on the decentralized schema identifier structure using the standard signatures.

The Decentralized Attestation Receipt (DAR) Structure

In some embodiments, a decentralized attestation receipt (or DAR) is the data structure (e.g. JSON structure) on the blockchain that contains the proof of consent by a subject relating to the execution of an algorithm (identified by a decentralized algorithm identifier) upon a data set (identified by a decentralized data set identifier) containing the subject's data following a schema (identified by a decentralized schema identifier) or, more generally, proof of the transaction itself. The decentralized attestation receipt is the evidence that the attestation provider obtains explicit consent from the subject. For aggregate-level responses, in which consent is not needed, the receipt provides proof of the transaction generally.

The decentralized attestation receipt data structure may be embodied in several formats and it contains some or all of the following information:

- Namespace of the attestation provider: This the namespace belonging to the attestation provider within which this decentralized attestation receipt is recognized and can be resolved.
- Resolvable identifier of the algorithm: This is the identifier string that when followed resolves to the service endpoint at the attestation provider for that given algorithm. In some embodiments, the resolved data, or metadata including a blockchain transaction identifier corresponding to the identifiers, is included.
- Resolvable identifier of the data set: This is the identifier string that when followed will resolve to the service endpoint at the attestation provider that holds the data set.
- Resolvable identifier of the schema: This is the identifier string that when followed will resolve to the service endpoint at the attestation provider that holds the data schema.
- Hash of the consent token wielded by the client: This is the cryptographic hash of the consent token that was issued by the authorization service to the client, as means by the subject to consent to the execution if the algorithm/data/schema as identified by the triple [decentralized algorithm identifier, decentralized data set identifier, decentralized schema identifier].
- Timestamp: This is the date timestamp when the decentralized attestation receipt structure was created and signed.
- Public key information of attestation provider: This is the public key of the attestation provider together with a legal certification of the public key to prove the legal ownership of the public key.

Digital signature of attestation provider: This is the cryptographic digital signature of the attestation provider on the decentralized attestation receipt data structure using the standard signatures.

The Decentralized Subject Identifier (DSID) Structure

In some embodiments, a decentralized subject identifier (or DSID) is a data structure (e.g. JSON structure) on the blockchain that provides a resolvable link to a protected service endpoint at an attestation provider where high-assurance vetted attribute information about the subject can be obtained.

In general, the creator and owner of a decentralized subject identifier is the entity (subject) that digitally signs the decentralized subject identifier structure and records the decentralized subject identifier to the blockchain. The creator/owner of a decentralized subject identifier may use the same private/public key pair to sign the decentralized subject identifier and to record it on the blockchain, or it may use two separate public/private key pairs to sign the decentralized subject identifier. In either case, there exists proof of legal ownership of the key (e.g. X509 certificate issued by a commercial certification authority).

Example Embodiments

According to some embodiments, a decentralized algorithm identifier or (DAI) is a signed data structure on the blockchain that describes an algorithm (e.g., in pseudocode), the required inputs to the algorithm, the resulting output, and a resolvable link to a protected service endpoint where a request can be made for its execution.

According to some embodiments, a decentralized data set identifier (or DDI) is a signed data structure on the blockchain that describes a data set available, together with the applicable algorithms (e.g., the decentralized algorithm identifier) that may be executed on the data set and a resolvable link to a protected service endpoint where the data set is located. The decentralized data set identifier does not carry the data set itself.

According to some embodiments, a decentralized schema identifier (or DSI) is a signed data structure on the blockchain that describes the schema (data schema) pertaining to a given data set together with a resolvable link to a protected service endpoint where the schema is located. Multiple data sets may be formed using the same data schema. The decentralized schema identifier does not carry the full schema itself.

According to some embodiments, a decentralized attestation receipt (or DAR) is a signed data structure on the blockchain that contains the proof or consent by a subject relating to the execution of an algorithm (identified by a decentralized algorithm identifier) upon a data set (identified by a decentralized data set identifier) containing the subject's data following a schema (identified by a decentralized schema identifier). In some examples, a decentralized attestation receipt is evidence that the attestation provider obtained explicit consent from the subject.

According to some embodiments, a decentralized subject identifier (or DSID) is a signed data structure on the blockchain that provides a resolvable link to a protected service endpoint where high-assurance vetted attribute information about the subject can be obtained.

According to some embodiments, an algorithm execution request protocol provides a mechanism for a client computing device to obtain information from a blockchain regarding an algorithm, data set, and data schema. The protocol provides a way for the client computing device to request an attestation provider entity to execute the algorithm upon the data set, with the consent of the subject whose personal data is included in the data set. In some embodiments, the protocol obtains explicit consent from the subject using an authorization service that creates a consent token for the client computing device. The client computing device delivers the consent token to the attestation provider together with the requested algorithm execution. The attestation provider executes the algorithm on the target data set and generates a response that is enveloped within a signed attestation claim structure. The protocol also provides a way for the attestation provider to create a signed attestation receipt structure as a mechanism to log the consented event and to record the attestation receipt to the blockchain.

Protocol for identifier records creation on the blockchain. According to some embodiments, a separate protocol is used by the attestation provider entity to register the existence of algorithms, data sets, and data schemas. In some embodiments, the attestation provider creates a record for the algorithm (or data set or schema) and digitally signs the record. The attestation provider then creates a new blockchain transaction containing that record, signs the transaction, and transmits the blockchain transaction to the relevant blockchain P2P network. After the transaction has been confirmed on the blockchain, the attestation provider creates a new resolver record for the identifier resolver service that is employed. The resolver record indicates, among others, the service endpoint at the attestation provider to which requests for the execution of the algorithm are to be directed.

Protocol for handling encrypted identifier records blockchain. According to some embodiments, for cases where the detailed information in a record for the algorithm (or data set or schema) is considered confidential, the relevant information is encrypted by the attestation provider using a symmetric key. Correspondingly, the resolver record for that algorithm record is made to point by the attestation provider to a key service endpoint operated by the attestation provider. Here, the client performs an extra step to obtain the decryption keys. As before, the client obtains the record for the algorithm from the blockchain, resolves the decentralized algorithm identifier to the correct identifier resolution service that returns a resolver record containing the address of the key service endpoint. After obtaining the correct decryption key from the key service endpoint, the client is able to decrypt the encrypted fields in the algorithm record found on the blockchain. Once the information has been decrypted, the client is able to proceed with the normal access to the algorithm service endpoint at the attestation provider.

Figure 4A:
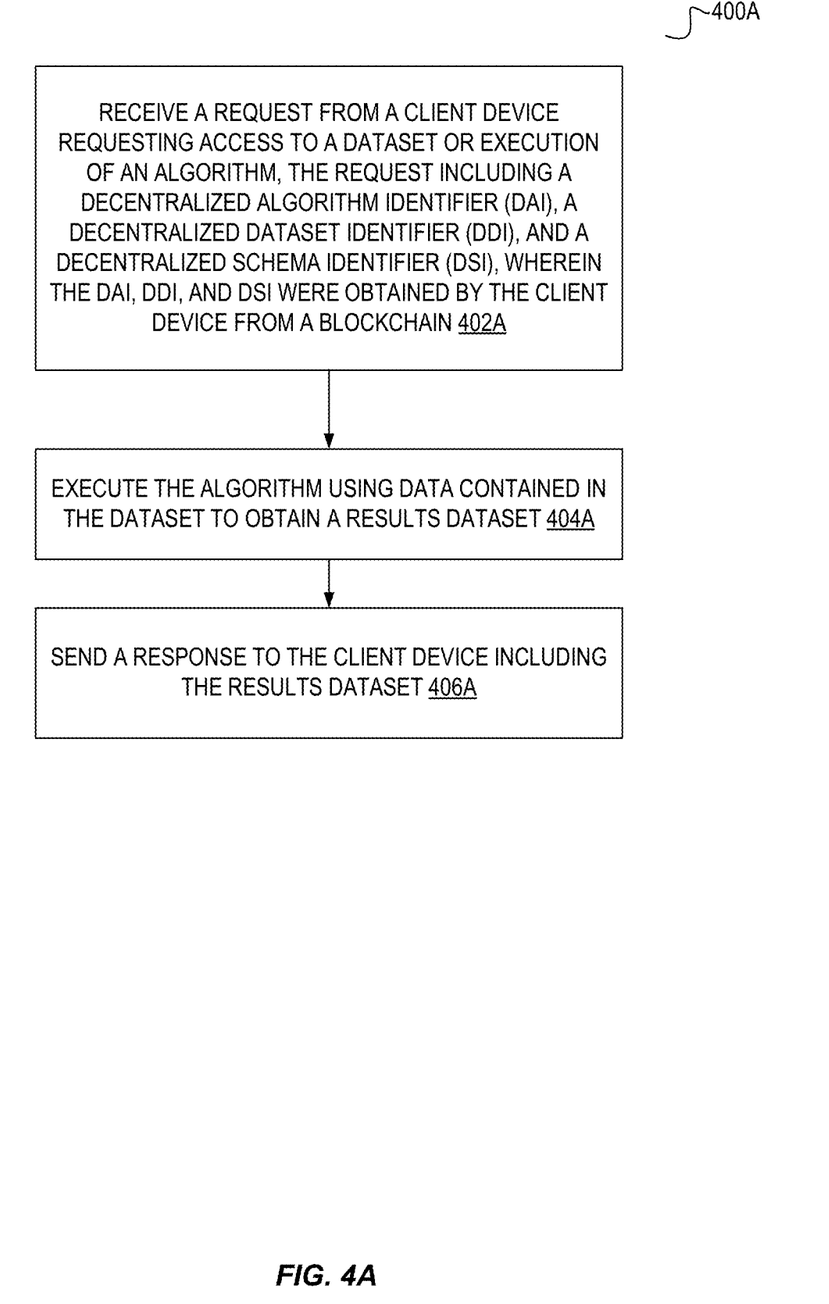
FIG. 4A is a flow diagram illustrating operations for an attestation provider system to process requests to execute algorithms and to deliver a response in an attestation claim according to some embodiments.

FIG. 4A is a flow diagram illustrating operations 400A of a method for an attestation provider system to process requests to execute algorithms and delivering a response in an attestation claim, according to some embodiments. Some or all of the operations 400A (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400A are performed by an AP 106 of the other figures.

The operations 400A include, at block 402A, receiving a request from a client device requesting access to a data set or execution of an algorithm, the request including a decentralized algorithm identifier (DAI), a decentralized data set identifier (DDI), and a decentralized schema identifier (DSI), wherein the DAI, DDI, and DSI were obtained by the client device from a blockchain.

The operations 400A further include, at block 404A, executing the algorithm using data contained in the data set to obtain a results data set.

The operations 400A further include, at block 406A, sending a response to the client device including the results data set.

In some embodiments, the request is received at an application programming interface (API) endpoint managed by an attestation provider (AP) system. In some embodiments, the request is received at an application programming interface (API) endpoint managed by an attestation provider (AP) system, and wherein an address of the API endpoint is located by the client device in a blockchain record. In some embodiments, the data set or the algorithm is subject-specific, and wherein the request further includes a decentralized subject identifier (DSID).

In some embodiments, the request is received at an application programming interface (API) endpoint managed by an attestation provider (AP) system, and wherein the client device obtains an address of the API endpoint using an identifier resolver service. In some embodiments, the data set or the algorithm is subject-specific, and wherein the request further includes a decentralized subject identifier (DSID), and wherein the method further includes: requesting an indication of the subject's consent from an authorization service, the authorization service storing consent policies indicating subject consent. In some embodiments, the results data set is returned in an attestation claims structure, wherein the attestation claims structure is digitally signed by the attestation provider system, and wherein the response is sent via a secure channel.

In some embodiments, the operations further include generating an attestation receipt and storing the attestation receipt on the blockchain. In some embodiments, the operations further include generating an attestation receipt and storing the attestation receipt on the blockchain, wherein the attestation receipt includes evidence of consent from a subject to which the data set pertains.

In some embodiments, the attestation provider system is implemented at least in part using computing resources provided by a cloud provider network. In some embodiments, the algorithm generates a response that is one of: an aggregate-level response, or a subject-specific response.

In some embodiments, the DAI is a data structure including at least one of: an identifier of a namespace of the attestation provider system, a resolvable identifier of the algorithm, an algorithm description, an algorithm author identifier, an indication of attestation output formats, a list of inputs, an identifier of a service endpoint to obtain attestation claims, a duration of validity, terms of service, a timestamp, public key information of the attestation provider system, or a digital signature of the attestation provider system.

In some embodiments, the DSI is a data structure including at least one of: an identifier of a namespace of the attestation provider system, a resolvable identifier of a schema, a data set type, a schema author identifier, terms of service, a timestamp, public key information of the attestation provider system, a digital signature of the attestation provider system.

In some embodiments, a decentralized attestation receipt (DAR) is a data structure including at least one of: an identifier of a namespace of the attestation provider system, a resolvable identifier of the algorithm, a resolvable identifier of the data set, a resolvable identifier of a schema, a hash of a consent token used by the client computing device a timestamp, public key information of the attestation provider system, or a digital signature of the attestation provider system.

Figure 4B:
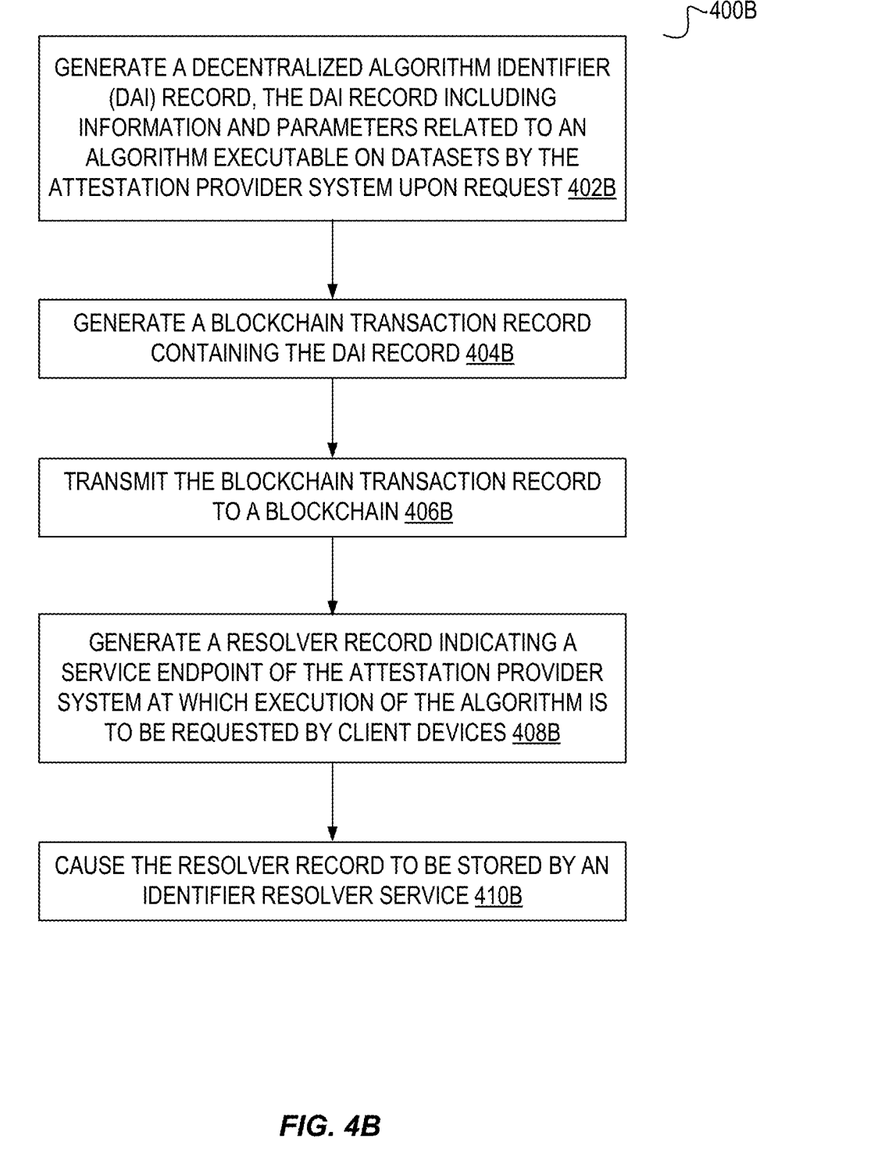
FIG. 4B is a flow diagram illustrating operations for an attestation provider system to register decentralized identifier records to a blockchain according to some embodiments.

FIG. 4B is a flow diagram illustrating operations 400B of a method for an attestation provider system to register decentralized identifier records to a blockchain, according to some embodiments. Some or all of the operations 400B (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400B are performed by an AP 106 of the other figures.

The operations 400B include, at block 402B, generating a decentralized algorithm identifier (DAI) record, the DAI record including information and parameters related to an algorithm executable on data sets by the attestation provider system upon request.

The operations 400B include, at block 404B, generating a blockchain transaction record containing the DAI record.

The operations 400B include, at block 406B, transmitting the blockchain transaction record to a blockchain.

The operations 400B include, at block 408B, generating a resolver record indicating a service endpoint of the attestation provider system at which execution of the algorithm is to be requested by client devices.

The operations 400B include, at block 410B, causing the resolver record to be stored by an identifier resolver service.

In some embodiments, the DAI record includes at least one of: a unique decentralized algorithm identifier, a mechanism to link-resolve that identifier via a resolver service, a description of the algorithm, a hash of an author identifier, expected inputs to the algorithm, or terms of use of the algorithm. In some embodiments, the operations further include determining that the blockchain transaction is confirmed by the blockchain; and confirming that the DAI record is accessible on the blockchain.

Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 5:
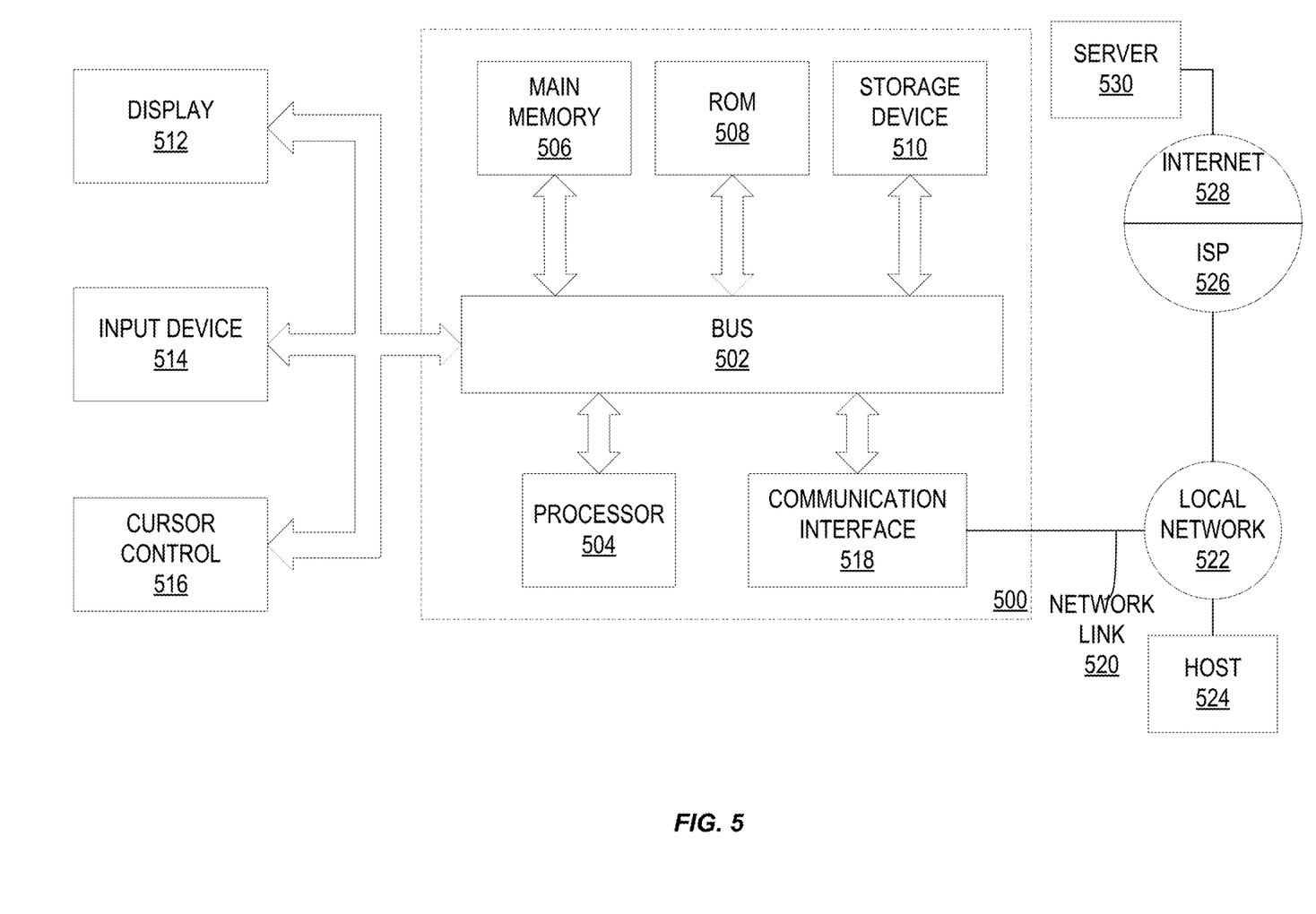
FIG. 5 is a block diagram illustrating an example computer system that may be used in some embodiments.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device.

Computer system 500 includes one or more buses 502 or other communication mechanism for communicating information, and one or more hardware processors 504 coupled with buses 502 for processing information. Hardware processors 504 may be, for example, general purpose microprocessors. Buses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method performed by an attestation provider system, the method comprising:
   receiving, from a client device, a request to execute an algorithm, wherein the request includes: an identifier of the algorithm and an identifier of a data set containing data to be used as input to the algorithm, wherein the identifier of the algorithm is obtained by the client device from a record stored on a blockchain, and wherein the record is associated with a digital signature of the attestation provider system;
   executing the algorithm using data contained in the data set to obtain a results data set; and
   sending a response to the client device including the results data set.

2. The computer-implemented method of claim 1, wherein the request is received at an application programming interface (API) endpoint managed by the attestation provider system, and wherein the API endpoint is identified in the record stored on the blockchain.

3. The computer-implemented method of claim 1, wherein the request further includes at least one value to be used as input to the algorithm.

4. The computer-implemented method of claim 1, wherein the data set or the algorithm is subject-specific, and wherein the request further includes an identifier of a subject.

5. The computer-implemented method of claim 1, wherein the request is received at an application programming interface (API) endpoint managed by the attestation provider system, and wherein the client device obtains an address of the API endpoint using an identifier resolver service.

6. The computer-implemented method of claim 1, wherein the algorithm is subject-specific, and wherein the request further includes an identifier of a subject, and wherein the method further includes: requesting an indication of the subject's consent from an authorization service to perform the algorithm, wherein the authorization service stores consent policies indicating subject consent.

7. The computer-implemented method of claim 1, wherein the results data set is returned in an attestation claims structure, wherein the attestation claims structure is digitally signed by the attestation provider system, and wherein the response is sent via a secure channel.

8. The computer-implemented method of claim 1, further comprising generating an attestation receipt and storing the attestation receipt on the blockchain.

9. The computer-implemented method of claim 1, further comprising generating an attestation receipt and storing the attestation receipt on the blockchain, wherein the attestation receipt includes evidence of consent from a subject to which the data set pertains.

10. The computer-implemented method of claim 1, wherein the attestation provider system is implemented at least in part using computing resources provided by a cloud provider network.

11. The computer-implemented method of claim 1, wherein the algorithm generates a response that is one of: an aggregate-level response, or a subject-specific response.

12. The computer-implemented method of claim 1, wherein the identifier of the algorithm is a data structure further including at least one of: an identifier of a namespace of the attestation provider system, a resolvable identifier of the algorithm, an algorithm description, an algorithm author identifier, an indication of attestation output formats, a duration of validity, terms of service, a timestamp, public key information of the attestation provider system, or a digital signature of the attestation provider system.

13. The computer-implemented method of claim 1, wherein the request further includes an identifier of a schema of the data set, and wherein the identifier of the schema is a data structure including at least one of: an identifier of a namespace of the attestation provider system, a resolvable identifier of a schema, a data set type, a schema author identifier, terms of service, a timestamp, public key information of the attestation provider system, a digital signature of the attestation provider system.

14. The computer-implemented method of claim 1, further comprising generating an attestation receipt, wherein the attestation receipt is a data structure including at least one of: an identifier of a namespace of the attestation provider system, a resolvable identifier of the algorithm, a resolvable identifier of the data set, a resolvable identifier of a schema, a hash of a consent token used by the client computing device, a timestamp, public key information of the attestation provider system, or a digital signature of the attestation provider system.

15. A system comprising:
an attestation provider implemented by a first one or more electronic devices comprising a processor, the attestation provider including instructions that upon execution cause the attestation provider to:
receive, from a client device, a request to execute an algorithm, wherein the request includes: an identifier of the algorithm and an identifier of a data set containing data to be used as input to the algorithm, wherein the identifier of the algorithm is obtained by the client device from a record stored on a blockchain, and wherein the record is associated with a digital signature of the attestation provider;
execute the algorithm using data contained in the data set to obtain a results data set; and
send a response to the client device including the results data set;
a client computing device implemented by a second one or more electronic devices comprising a processor, the client computing device including instructions that upon execution cause the client computing device to:
send the request to the attestation provider requesting execution of the algorithm.

16. The system of claim 15, wherein the request is received at an application programming interface (API) endpoint managed by an attestation provider, and wherein the API endpoint is identified in the record stored on the blockchain.

17. The system of claim 15, wherein the request further includes at least one value to be used as input to the algorithm.

18. The system of claim 15, wherein the data set or the algorithm is subject-specific, and wherein the request further includes an identifier of a subject.

19. The system of claim 15, wherein the request is received at an application programming interface (API) endpoint managed by the attestation provider, and wherein the client device obtains an address of the API endpoint using an identifier resolver service.

20. The system of claim 15, wherein the algorithm is subject-specific, and wherein the request further includes an identifier of a subject, and wherein the instructions upon execution further cause the attestation provider to: request an indication of the subject's consent from an authorization service to perform the algorithm, wherein the authorization service stores consent policies indicating subject consent.

* * * * *